UNITED STATES PATENT OFFICE.

CHARLES ILES, OF BIRMINGHAM, ENGLAND, ASSIGNOR TO EDWARD H. ASHCROFT; SAID ASHCROFT ASSIGNOR TO HIMSELF AND GEORGE W. SAVAGE.

IMPROVEMENT IN IMITATION STONE.

Specification forming part of Letters Patent No. 9,026, dated June 15, 1852.

*To all whom it may concern:*

Be it known that I, CHARLES ILES, of the borough of Birmingham, in England, machinist, have invented improvements in compositions for manufacturing picture-frames, inkstands, and other articles in dies or molds, also for producing ornamental surfaces generally; and I do hereby declare that the nature of my said invention and the manner in which the same is to be carried into effect are fully described and ascertained in and by the following statement thereof—that is to say:

My invention consists of improvements in composition for the manufacture of picture-frames, inkstands, and other articles in dies or molds for producing ornamental surfaces generally; and in order that my invention may be most fully understood and readily carried into effect, I will proceed to describe the means pursued by me.

In manufacturing picture-frames, inkstands, trays, bobbins, (for cotton and other thread,) stands of various kinds, knobs and other handles, buttons, and numerous other articles capable of being made from plastic matters in dies or molds, I cause any suitable plastic matter or material to be combined with colored silk waste, or it might be with other colored fibrous matters; but I believe silk waste to be the best for the purposes of my invention, or mixtures of these matters may be used, and the colored silk waste or colored fibrous matter employed is to be of a different color or colors to that of the plastic matter with which the same is combined, in order that those portions of the colored fibers which come to the surface may give to the fabricated article a veined or marbled appearance, and it is the giving of such veined or marbled appearance by means of colored silk waste or other colored fibrous matter or matters to articles made in dies or molds from plastic composition which constitutes the peculiarity of this part of my invention. I would state that in carrying out this part of my invention various plastic matters may be employed; but I prefer to use the following, because the same is readily molded in dies or molds and takes and retains a good impression, and becomes very hard when dry; but I make no claim to such plastic material, nor do I confine myself thereto, as others may be employed, this part of my invention not consisting of a plastic material, but the combining of colored silk waste or other colored fibrous matters with plastic materials when forming picture-frames, inkstands, and other articles in dies or molds. The plastic material I prefer for such purposes are as follows: rosin, four parts, by weight; wax, one part; glue, six parts; alum, four parts; gypsum, twelve parts. I melt the rosin and wax in any convenient vessel, and add thereto a hot solution of glue, and afterward add the alum and gypsum in the state of powder and stir these matters well together, coloring such composition, when desired, and I stir in a quantity of fibrous materials, such as above described, sufficient to produce the required intensity of shade or color, and then cast the composition in molds, and the result will be that the colored fibers which come to the surface will give a varied character thereto, and such will be the case when using other plastic matters in place of those above mentioned.

I will now describe the second part of my invention as applied to the production of ornamental surfaces on walls and other places, and on various matters of a veined or marbled character, by employing colored silk waste, or other colored fibrous matters, in combination with suitable cement, the colored fibrous matters, so far as they come to the surface, producing the desired veined or marbled effect. In carrying out this part of my invention I employ Keene's plaster-of-paris, or other cement capable of producing a smooth hard surface, and I mix colored silk waste or other colored fibrous matters, or more than one sort of fiber and of one or more colors, the color or colors used being different from that of the cement, and I mix such fibers in quantities that will give the required tint or depth of color, and I cause such cement to be spread on a wall or other surface and floated and laid smooth, as when using cements or plaster without the colored silk waste or other fiber. By this means very ornamental effects may be produced of a veined or marbled character, depending on the colors of the cements employed and the colors of the silk waste or other fibers used therewith. I would remark that the silk waste or other fibrous material used for the purpose of my invention are to be dyed, as such matters are usually dyed when for other purposes.

Having thus described the nature of my invention and the manner of performing the same, I would have it understood that I do not confine myself to the details as herein described so long as the peculiar character of either part of my invention be retained; but

What I claim is—

The production of ornamental surfaces on picture-frames, inkstands, other articles, and on walls and other places, and on different matters, by applying thereto colored silk waste or other colored fibrous substances combined with cement in such manner that the colored silk waste or other colored fibrous matters used shall produce a veined or marbled character.

In testimony whereof I, the said CHARLES ILES, hereunto subscribe my name, in the presence of the witnesses whose names are hereto subscribed, on the 2d day of April, 1852.

CHAS. ILES.

Witnesses:
   THOS. HANEY,
      *Solicitor, of Birmingham.*
   C. BAYLEY KING,
      *His Clerk.*